July 6, 1954    J. SALAUZE    2,683,182
NEGATIVE ELECTRODE FOR ALKALINE STORAGE BATTERIES
AND METHOD OF MANUFACTURING THE SAME
Filed April 27, 1953
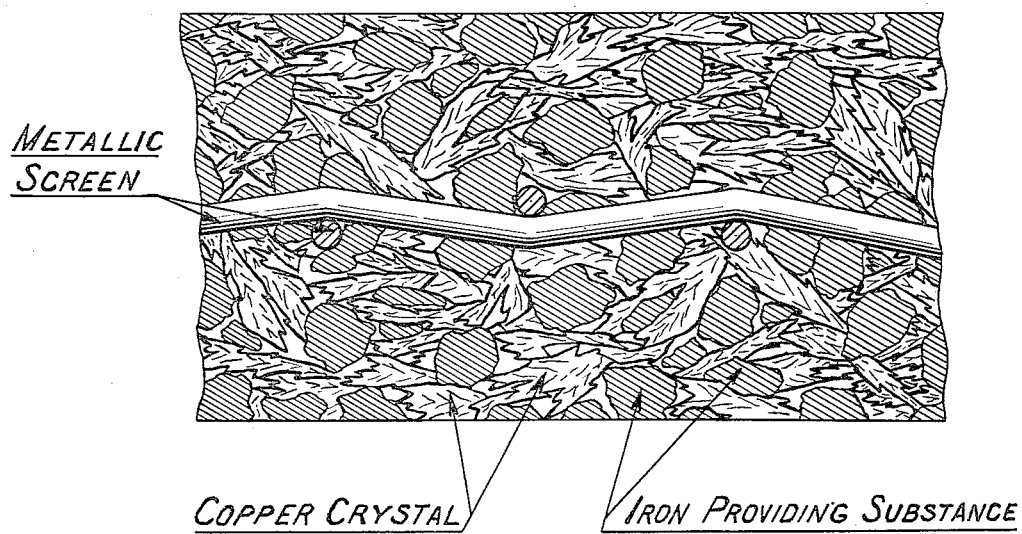
METALLIC SCREEN
COPPER CRYSTAL    IRON PROVIDING SUBSTANCE
JEAN SALAUZE
INVENTOR.
BY Kenyon & Kenyon
ATTORNEYS.

Patented July 6, 1954

2,683,182

UNITED STATES PATENT OFFICE 2,683,182

NEGATIVE ELECTRODE FOR ALKALINE STORAGE BATTERIES AND METHOD OF MANUFACTURING THE SAME

Jean Salauze, Paris, France, assignor to Societe des Accumulateurs Fixes & de Traction, Romainville, France, a French corporate body Application April 27, 1953, Serial No. 351,480

Claims priority, application France December 14, 1950

16 Claims. (Cl. 136—23)

The present application is a continuation-in-part of my copending application, Ser. No. 207,237, filed January 22, 1951 (now U. S. Patent No. 2,643,276, issued June 23, 1953).

In said copending application a method has been described aiming at the manufacture of negative electric plates for alkaline storage batteries. According to the said method, the plate is formed of a basic material which is copper in finely divided condition and consisting of minute acicular, dendritic or arborescent crystals, said copper being thoroughly mixed with pulverulent iron or an iron providing compound adapted to produce iron when the battery is being charged, said iron or iron providing substance being used as the active elements of the plate. The mixture is thereupon compressed under a relatively high pressure on suitable frames embedded in said mixture.

The compression and the simultaneous interlacing action of the copper crystals result in the formation of a coherent and porous solid structure enclosing the iron material, wherein the preferably perforated frame acts as a supporting structure and as a conductor.

Experience shows that these plates constitute a substantial improvement in the field of alkaline batteries. The efficiency-to-weight ratio, in terms of one gram of iron, is considerably increased; moreover, batteries equipped with these plates are surprisingly insensitive to low temperatures, have a higher discharge voltage (particularly noticeable at high rates) and their high insensitiveness to manganese makes it possible to use relatively cheap or even very cheap ordinary ferrous products (residues, scraps, cuttings, etc.) as a starting material for the manufacture of the active elements.

As already stated in said copending application, the iron powder used may have different origins and its intrinsic value is closely related to this origin.

It is also stated in this copending application that an iron particularly suitable for the manufacture of plates having very interesting qualities was obtained when reducing ferric oxide by means of hydrogen or carbon monoxide. It was also observed that very interesting results were realized when using the magnetic oxide as an iron providing substance.

One object of the present invention is to provide improvements to this earlier described method.

Another object of this invention is to provide a series of different embodiments according to which the iron or iron providing compound are in a very fine pulverulent condition and have a relatively low specific weight whereas their porosity is as high as possible.

The accompanying drawing is a diagrammatic illustration on a greatly enlarged scale of a fragmentary portion of an electrode plate made in accordance with the methods of this invention and illustrating diagrammatically the structure and inter-relationship of the components forming the plate.

According to a first embodiment, when iron powder is employed the latter may advantageously be prepared by passing hydrogen through the ferric oxide obtained by roasting an iron salt at a relatively low temperature and reducing this oxide at a temperature which is also relatively low so as to prevent the iron thus obtained from re-crystallizing and sintering.

According to still other embodiments, the active substance used consists of magnetic oxide, preferably in the form of a porous and finely divided mass obtained, for example, by the hydrogen reduction of a ferric oxide, preferably also in porous and divided state, obtained through a suitable thermal decomposition of an iron salt such as sulphate, oxalate, formiate, carbonate, nitrate, chloride or the like.

According to a still other embodiment, the active substance used consists of magnetic oxide obtained by careful decomposition, in the absence of atmospheric oxygen, of certain iron salts such as oxalates, carbonates, formiates, and the like.

The above indicated embodiments will be explained herebelow and several examples will be given.

In the first place, regarding the use of pure iron, it is important to point out, once more, that its origin is an essential factor. An iron powder giving excellent results is obtained, for example, through the well known sequence of operations consisting in dissolving the iron with sulphuric acid, crystallizing the sulphate of iron, dehydrating the latter, roasting it to produce ferric oxide, and finally reducing this ferric oxide with hydrogen at a relatively low temperature. This sequence of operations must be attended by the constant precaution of avoiding the formation of too dense products. To this end, among other precautions, the sulphate must be roasted preferably at a relatively low temperature and, above all, the ferric oxide must be removed from the roasting furnace a short time after its formation. The hydrogen reduction of this ferric oxide must also be conducted at a relatively low temperature (about 500° C.) in order to prevent the resulting iron from re-crystallizing and sintering. If all these precautions are taken, irons in powdered condition, having a low density and high porosity, will be obtained, such irons constituting an excellent negative active substance having a good efficiency-to-weight ratio.

The sequence of operations indicated above is certainly the most conventional and is used industrially, but it is not unique in the field. Its last step, hydrogen reduction of ferric oxide is compulsory, but between the initial iron and the produced ferric oxide many practices may be followed. Thus, for instance, the solution of ferrous sulphate may be treated with a solution of sodium oxalate in order to precipitate the iron oxalate which can readily be roasted and gives an excellent ferric oxide. It is also possible to dispense with the roasting of ferrous sulphate as such, which is unpleasant on account of the release of sulphurous and sulphuric gases, by admixing it with sodium carbonate and heating between 150° and 1000° C. Many other processes may be resorted to, provided only they lead to a ferric oxide having a low density and a porous structure.

In the above mentioned copending application the possibility is pointed out of employing not only iron in powdered form but also any substance capable of providing iron during the charge of the battery. This substance is admixed with arborescent or acicular copper crystals and it will be sufficient to produce iron from this substance during the electrolytic reduction occurring at the negative pole of the alkaline battery when the latter is being charged. As an example of this substance, magnetic oxide $Fe_3O_4$ is cited in the copending application.

There are many different ways for the preparation of this magnetic oxide $Fe_3O_4$ so that as many dissimilar physical aspects can be given thereto, each of the latter being characteristic of the method of preparation of the $Fe_3O_4$ which is employed. Thus, it has been known for a long time that this oxide occurs in scale or flake form when hot rolling iron and also when forging operations are accomplished; hence the name of "rolling-mill scale oxide" applied to this variety of magnetic oxide. It is also known to prepare this magnetic oxide by causing steam heated at relatively high temperatures (ranging, for example, from 800° to 1000° C.) to act on iron. Furthermore, this oxide may be obtained by carefully roasting iron salts in the absence of any excess of oxygen which would convert it into ferric oxide $Fe_2O_3$. Finally, the very simplest way of obtaining this oxide consists in effecting the careful reduction of the ferric oxide $Fe_2O_3$ with hydrogen. It is known that the first step in this reduction gives magnetic oxide $Fe_3O_4$ and that this step takes place irrespective of the steam content of the hydrogen used. Although no exact value can be put forward regarding the temperature at which this reaction takes place, it may be said that at about 350° C. it proceeds at a rate which is sufficient for industrial applications.

It is also known that magnetic oxide placed in a hydrogen atmosphere is reduced in turn and is thus converted, according to the temperature, either directly into iron (that is, below 570° C.) or firstly into ferrous oxide (FeO). This constitutes the second step in the reduction of ferric oxide. During this second step the reduction ceases when the steam content of hydrogen attains a value which is dependent upon the temperature. For a given reaction speed, the step $Fe_2O_3 \rightarrow Fe_3O_4$ may take place at a lower temperature than the step $Fe_3O_4 \rightarrow Fe$. Finally, it may be added that this transformation of ferric oxide into magnetic oxide will require nine times less hydrogen than the iron-yielding reaction.

$$3Fe_2O_3 + 2H = 2Fe_3O_4 + H_2O$$
$$3Fe_2O_3 + 18H = 6Fe + 9H_2O$$

The transformation of ferric oxide into magnetic oxide can be carried out at a lower temperature, is simpler to conduct and by operating in the temperature range of 300° to 400° C. the two chief drawbacks which usually render the obtention of a high-capacity iron active substance a difficult operation, i. e., re-crystallization and sintering, do not arise in the case of magnetic oxide. It is obvious that the substitution for iron of a suitable magnetic oxide manufactured as described constitutes a valuable improvement in the art.

Towards the year nineteen hundred various attempts, without any practical outcome, had been made with the view of utilizing magnetic oxide as a negative active material. Of course, all these attempts had for their object the use of magnetic oxide in assemblies employed at that time and having nothing in common with the method described in the said copending application. The tests made by Edison, Jungner and Max Roloff may be cited in this connection. Curiously enough, these tests dealt with a variety of magnetic oxide known under the name of "rolling-mill scales."

Now, applicant has found that between the various forms of magnetic oxide a distinction can be made in a similar way as in the case of the various forms of iron in powdered form. Thus, whether one or the other of these two products is used, either in the conventional pocket assembly or in the manner recited in the copending application, each shape, which corresponds somewhat to a characteristic feature of the method of preparation utilized, shows an electrical capacity of its own. In other words, the different varieties of magnetic oxide have not the same electrical value and in this respect it is essential to establish a classification among them.

Experience teaches that a good variety is magnetic oxide in divided and porous form, of low density (ranging from 0.5 and 1.0, although these are not limiting values) as amply disclosed hereabove. This variety can be prepared in a very simple and easy manner by reducing with hydrogen the ferric oxide resulting in turn from the thermal decomposition of an iron salt such as a sulphate, oxalate, formiate, carbonate, nitrate, chloride, and the like. In order to facilitate and improve the molding, that is for compacting in an easy and lasting manner the mixture of copper in powdered form and magnetite, it is preferable that the shape of the copper crystals be harmonized with that of the particles of magnetic oxide. In order to afford a clearer understanding of this specific point, it will be sufficient to consider that when commercial copper in powdered condition in the form of microscopic acicular, arborescent or dentritical crystals, obtained electrolytically and characterized by an apparent density ranging from 0.8 and 1.0 is used, excellent moldings are obtained when the magnetite admixed therewith passes through a No. 80 or 100 mesh sieve. Of course, the figures given in this example are only illustrative and should not be construed as limiting the scope of the invention. By using a magnetic oxide of this type in admixture with 40% to 50% of copper in powdered form, and compressing the mixture under a pressure ranging from at least 1 metric ton/sq. cm. and upward to 2 to 3 tons/sq. cm., or more, plates are obtained, the efficiency-to-weight ratio of which may attain even 1 amp./hr. for every 2.6 grams of iron employed.

Of course, the active substance may be a mixture of iron and magnetic oxide in powdered form as defined hereinabove.

The careful decomposition of the iron salts mentioned hereabove, if accomplished in a sufficient absence of air, makes it possible also to obtain magnetic oxide having good capacities. Then follow the so-called "rolling-mill scale oxide" form of magnetic oxide and finally the magnetic oxide resulting from the treatment of iron in the presence of steam with, however, less efficient results than in the first two instances.

Of course, the present invention is also concerned with the plates obtained by carrying out the various forms of embodiment of the process which have been described hereabove.

Obviously, the invention is not restricted to the sole examples, proportions and values indicated in the specification since they are given for illustrative purposes only.

What I claim is:

1. A method of producing a negative plate for an alkaline electric accumulator, comprising the steps of preparing a mixture by intimately mixing a finely-divided copper composed of minute crystals having an acicular, arborescent, dendritical or needle-like shape, with an active negative material consisting of finely-divided iron providing substance, said active negative material in said mixture being in the proportions of between 20% and 80% and preferably in the the proportion of 50% of said mixture, coating the mixture over and into the interstices of a mesh-like support and compressing the coated assembly at substantially ordinary room temperature and at a pressure of at least 1 metric ton per square centimeter, said iron providing substance being of very low apparent density and very high porosity and being produced by appropriate thermal reduction of an appropriate form of ferric oxide that is of low apparent density and high porosity.

2. A method according to claim 1 wherein the iron providing substance is iron powder, this latter being produced from ferric oxide as an intermediary product obtained by roasting an iron salt at a relatively low temperature, and the reduction of the ferric oxide also being carried out at a low temperature so as to prevent the iron which is obtained in this way from re-crystallizing and sintering.

3. A method according to claim 1 wherein the active negative material consists of magnetic oxide, preferably in the form of a porous and divided mass, obtained from the reduction by hydrogen of a ferric oxide, preferably also in a porous and divided state, obtained through a suitable thermal decomposition of an iron salt selected from the group consisting of sulphates, oxalates, formiates, carbonates, nitrates, and chlorides of iron.

4. A method according to claim 1 wherein the active negative material consists of a mixture of iron and magnetic oxide.

5. In a method of manufacturing negative electric plates for alkaline accumulators, the steps comprising mixing together a basic material composed of finely-divided copper having the shape of microscopic, acicular or dendritical crystals with an active material which consists of a finely-divided iron providing substance and of compressing said mixture under a high pressure on suitable supporting frames, said iron providing substance having a very low density and a very high porosity and being magnetic oxide resulting directly from the careful decomposition in the absence of atmospheric oxygen, of iron salts selected from the group consisting of oxalates, carbonates, formiates, nitrates and chlorides of iron.

6. In a method of manufacturing negative electric plates for alkaline accumulators, the steps comprising mixing together a basic material composed of finely-divided copper having the shape of microscopic, acicular or dendritical crystals with an active material which consists of a finely-divided iron providing substance and of compressing said mixture under a high pressure on suitable supporting frames, said iron providing substance having a very low density and a very high porosity and being the so-called "rolling-mill magnetic iron oxide."

7. In a method of manufacturing negative electric plates for alkaline accumulators, the steps comprising mixing together a basic material composed of finely-divided copper having the shape of microscopic, acicular or dendritical crystals with an active material which consists of a finely-divided iron providing substance and of compressing said mixture under a high pressure on suitable supporting frames, said iron providing substance having a very low density and a very high porosity and being magnetic iron oxide resulting from the action on iron of very hot steam.

8. In a method of manufacturing negative electric plates for alkaline accumulators the steps comprising roasting an iron salt at relatively low temperature to produce ferric oxide as an intermediary product in finely divided low density, high porosity form, reducing this ferric oxide at low temperature to produce iron and prevent its re-crystallizing and sintering, mixing the low density, high porosity, finely divided iron so obtained together with a basic material composed of finely divided copper having the shape of microscopic acicular or dendritical crystals, and compressing mixture under high pressure on a supporting frame.

9. The method of claim 8, wherein the roasting of iron salt is effected at relatively low temperatures of approximately 950° C. and the reduction of the ferric oxide produced is carried out with hydrogen also at relatively low temperatures not in excess of about 500° C. to prevent re-crystallization and sintering of the iron after reduction.

10. In a method of manufacturing negative electric plates for alkaline accumulators the steps comprising dissolving iron with sulphuric acid to form iron sulphate, crystallizing said sulphate, dehydrating the sulphate, powdering the sulphate, roasting said powdered sulphate at relatively low temperature, removing the roasted ferric oxide product shortly after its formation, reducing the removed ferric oxide with hydrogen at relatively low temperature of about 500° C., to prevent the iron resulting from the reduction from re-crystallizing and sintering, intimately mixing the resulting iron with finely divided copper having the shape of microscopic acicular or dendritical crystals and embedding a supporting frame in the mixture, compressing the mixture under high pressure on said supporting frame.

11. In a method of manufacturing negative electric plates for alkaline accumulators the steps comprising thermally decomposing an iron salt selected from the group consisting of sulphates, oxalates, formiates, carbonates, nitrates and chlorides of iron to produce ferric oxide, reducing with hydrogen said ferric oxide to produce magnetic oxide of iron in powdered form capable of passing through an 80 to 100-mesh sieve, intimately mixing powdered copper having the shape of microscopic acicular or dendritical crystals and compressing such mixture under a pressure of at least 1 ton per sq. cm.

12. The method of claim 11, wherein the powdered copper constitutes 40% to 50% by weight of the mixture and has a density ranging from approximately 0.8 to 1, and wherein the magnetic oxide is in finely divided porous form having a low density ranging from 0.5 to 1.

13. A negative electric plate for alkaline accumulators produced by the method of claim 1.

14. A negative electric plate for alkaline accumulators produced by the method of claim 8.

15. A negative electric plate for alkaline accumulators produced by the method of claim 10.

16. A negative electric plate for alkaline accumulators produced by the method of claim 11.

References Cited in the file of this patent
UNITED STATES PATENTS

| Number | Name | Date |
|---|---|---|
| 2,267,918 | Hildabolt | Dec. 30, 1941 |